US007062805B2

(12) United States Patent
Hopper et al.

(10) Patent No.: US 7,062,805 B2
(45) Date of Patent: Jun. 20, 2006

(54) PEDAL CONTROL OF BRAKE AND AUXILIARY WHEEL DEPLOYMENT VIA SIDE AND END ARTICULATION

(75) Inventors: Christopher J. Hopper, Kalamazoo, MI (US); Michael J. Hernandez, Kalamazoo, MI (US); Greggory S. Taylor, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 243 days.

(21) Appl. No.: 10/664,461

(22) Filed: Sep. 17, 2003

(65) Prior Publication Data

US 2005/0057010 A1 Mar. 17, 2005

(51) Int. Cl.
*A61G 1/02* (2006.01)
*B60B 11/10* (2006.01)

(52) U.S. Cl. .......................... 5/86.1; 5/600; 280/47.16

(58) Field of Classification Search .................. 5/86.1, 5/600, 81.1 R; 280/47.16, 43, 43.17; 296/20
See application file for complete search history.

(56) References Cited

U.S. PATENT DOCUMENTS 3,304,116 A 2/1967 Stryker ........................ 296/20
4,763,910 A 8/1988 Brändli et al. ................ 280/29
5,348,326 A 9/1994 Fullenkamp et al. .... 280/43.17
5,806,111 A * 9/1998 Heimbrock et al. .......... 5/86.1
5,987,671 A 11/1999 Heimbrock et al. ........... 5/600
6,016,580 A * 1/2000 Heimbrock et al. .......... 5/86.1
6,230,343 B1 * 5/2001 Buiskool et al. ............... 5/610
6,240,579 B1 6/2001 Hanson et al. ................ 5/86.1
6,256,812 B1 7/2001 Bartow et al. ................ 5/86.1
6,286,165 B1 * 9/2001 Heimbrock et al. ........... 5/600
6,330,926 B1 * 12/2001 Heimbrock et al. ....... 180/65.5
6,505,359 B1 * 1/2003 Heimbrock et al. .......... 5/86.1
6,588,523 B1 * 7/2003 Heimbrock et al. ....... 180/65.5
6,752,224 B1 * 6/2004 Hopper et al. ................ 180/22
6,772,460 B1 * 8/2004 Heimbrock et al. ........... 5/611

(Continued)

FOREIGN PATENT DOCUMENTS

DE 43 19 516 12/1994

OTHER PUBLICATIONS

Stryker Model 1001, stretcher having a fifth wheel (7 photographs—A through G), Aug., 1994.
U.S. Appl. No. 09/489,584, filed Jan. 21, 2000 Inventors: Keith Waters, Dennis Reed, Mark Friedman, Craig Mulder and Steve Nichols.

*Primary Examiner*—Robert G. Santos
(74) *Attorney, Agent, or Firm*—Flynn, Thiel, Boutell & Tanis, P.C.

(57) ABSTRACT

A wheeled carriage for supporting a patient includes a patient support with head and foot ends and a wheeled base supported by castered wheels. Auxiliary wheels secured to an auxiliary wheel support structure are suspendedly mounted to the wheeled base. A control apparatus includes manipulative members, such as foot pedals at the head and foot ends and at the lateral sides of the wheeled carriage. The side foot pedals are supported by a transverse control shaft. The transverse control shaft extends through apertures in the auxiliary wheel support structure. Wheel bearing devices rotatably attach the auxiliary wheels relative to the transverse control shaft. A linkage arrangement enables the side foot pedals to physically move with the auxiliary wheels during movement between deployed and stowed positions.

24 Claims, 15 Drawing Sheets

U.S. PATENT DOCUMENTS 6,792,630 B1 * 9/2004 Palmatier et al. ............. 5/86.1
6,902,019 B1 * 6/2005 Heimbrock et al. ....... 180/65.5
2003/0159861 A1 8/2003 Hopper et al. ................ 180/22
2005/0057010 A1 * 3/2005 Hopper et al. ........... 280/47.16

* cited by examiner

PEDAL CONTROL OF BRAKE AND AUXILIARY WHEEL DEPLOYMENT VIA SIDE AND END ARTICULATION

FIELD OF THE INVENTION

This invention relates to a wheeled carriage for supporting a patient in a substantially horizontal position and, more particularly, to an auxiliary wheel arrangement including manipulative members on the ends and sides of the wheeled carriage for facilitating the raising of an auxiliary wheel away from a floor surface and the lowering of the auxiliary wheel onto the floor surface and to, if desired, to lift the castered wheels at one end away from the floor.

BACKGROUND OF THE INVENTION

Wheeled carriages for supporting a patient in a substantially horizontal position are well known in the art and a representative example of an early version of such a device is illustrated in Dr. Homer H. Stryker's U.S. Pat. No. 3,304,116, reference to which is incorporated herein. Another example of such wheeled carriages is disclosed in U.S. Pat. No. 6,256,812, which is presently owned by the Assignee of record for this invention, and incorporated by reference herein.

U.S. Pat. No. 6,240,579 discloses a unitary pedal control of brake and fifth wheel deployment including pedals mounted on the ends and sides of the wheeled carriage to control braking and deployment of a fifth wheel. This patent is presently owned by the Assignee of record for this invention, and is incorporated by reference herein.

U.S. Pat. No. 6,286,165 discloses a stretcher for transporting a patient including a rotatable shaft controllable to move an auxiliary wheel to a first position engaging a floor surface and moving the auxiliary wheel to a second stowed position spaced apart from the floor surface. Rotating the shaft to another position operates upon a linkage to transition the stretcher from a neutral condition to a braked condition.

One object of the invention is to provide an auxiliary wheel control mechanism that moves with the auxiliary wheel between the deployed and stowed positions.

Another object of the invention is to locate the auxiliary wheel control mechanism along the axis of rotation of a pair of laterally spaced auxiliary wheels.

SUMMARY OF THE INVENTION

The objects and purposes of the invention are met by providing a wheeled carriage for supporting a patient in a substantially horizontal position, which has thereon a patient support having a head end and a foot end, a pair of lateral sides intermediate the head and foot ends, and a wheeled base having a length and enabling movement of the patient support. The wheeled base includes at least four floor surface engaging and castered wheels spaced from one another. An auxiliary wheel support structure is secured to the wheeled base and suspendedly supports auxiliary wheels about an axis transverse to the length of the wheeled base. A control apparatus controls the auxiliary wheel support structure to move the auxiliary wheels between a first deployed position whereat the auxiliary wheels are in contact with a floor surface and a second stowed position whereat the auxiliary wheels are out of engagement with the floor surface. The control apparatus includes at least one manipulative member mounted to the auxiliary wheel support structure that is lowered relative to the wheeled base during movement of the auxiliary wheels to the deployed position and raised relative to the wheeled base during movement of the auxiliary wheels to the stowed position. The control apparatus includes a transverse control shaft rotatably secured to the auxiliary wheel support structure and supporting the manipulative member at a lateral side of the wheeled carriage.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
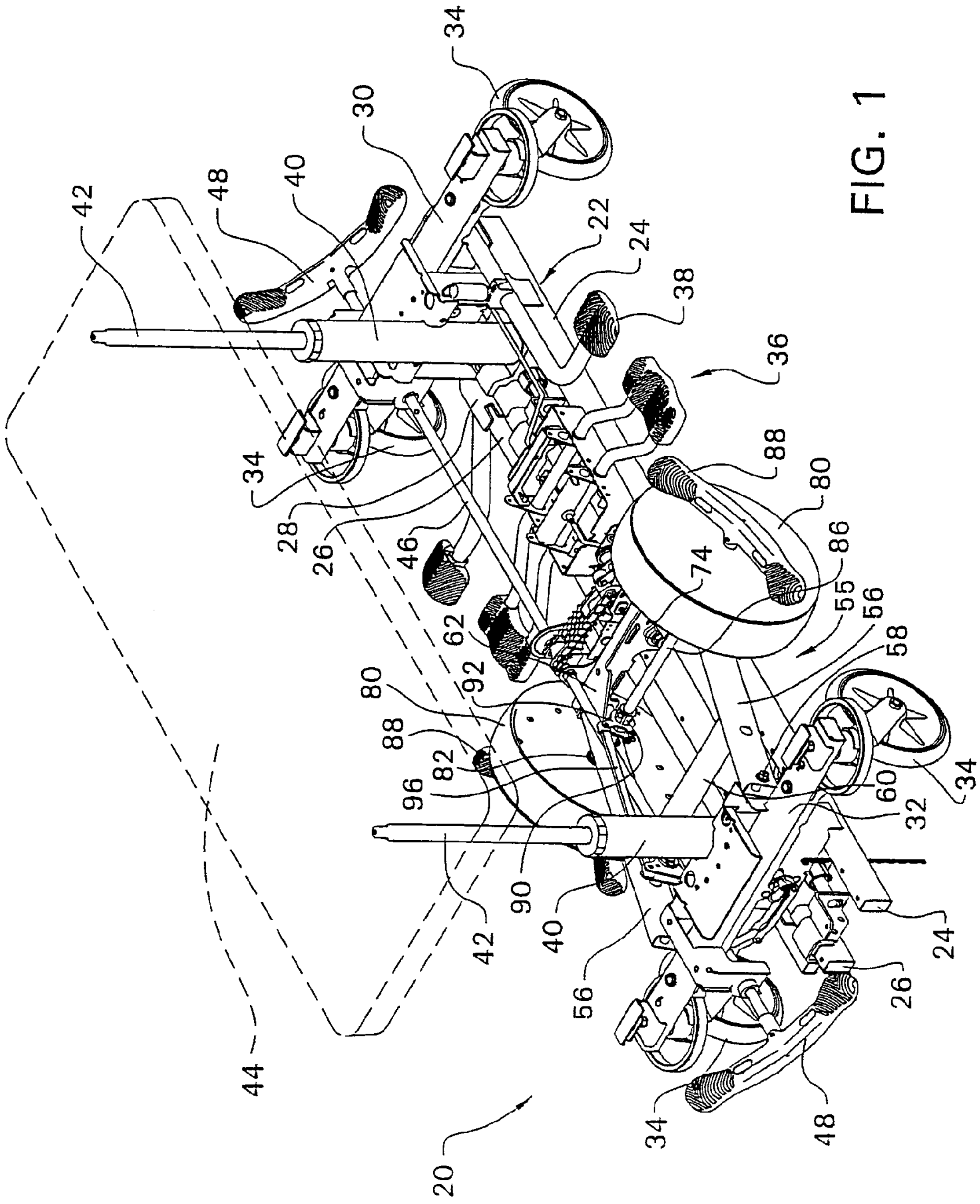
FIG. 1 is an isometric view of a wheeled carriage embodying the invention in a braked condition and the auxiliary wheels in the stowed position, the patient support deck being illustrated in broken lines.

Certain terminology will be used in the following description for convenience and reference only, and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

FIG. 1 is an illustration of a wheeled carriage 20 for supporting a patient in a substantially horizontal position. The wheeled carriage 20 includes a frame or wheeled base 22 defined in part by a pair of spaced elongate parallel support bars 24, 26 that extend parallel to each other. The parallel support bars 24 and 26 are interconnected at a plurality of locations. For example, a manifold 28 extends between and is secured to the support bars 24 and 26. The wheeled base 22 includes transverse beams 30 and 32 at opposing ends thereof. Castered wheels 34 are secured at opposing ends of the beams 30 and 32. The wheeled carriage 20 includes a deck control pedal arrangement 36 extending outwardly on opposing lateral sides of the wheeled carriage. A deck raising pedal 38 is also positioned on lateral sides of the wheeled carriage 20. Spaced hydraulic jacks 40 receive piston rods 42 for raising and lowering a patient support deck 44. The wheeled carriage 20 includes a substantially longitudinally oriented two part control shaft 46 rotatably mounted to the frame 22 and extending the length thereof. Manipulative members, such as end foot pedals 48, are secured at opposing ends of the longitudinally oriented control shaft 46.

A detailed discussion of the above identified elements and other unlabeled elements illustrated in the figures are disclosed in U.S. patent application Ser. No. 10/083,234 filed Feb. 26, 2002, now U.S. Pat. No. 6,820,294, the disclosure of which is incorporated by reference herein.

Figure 5:
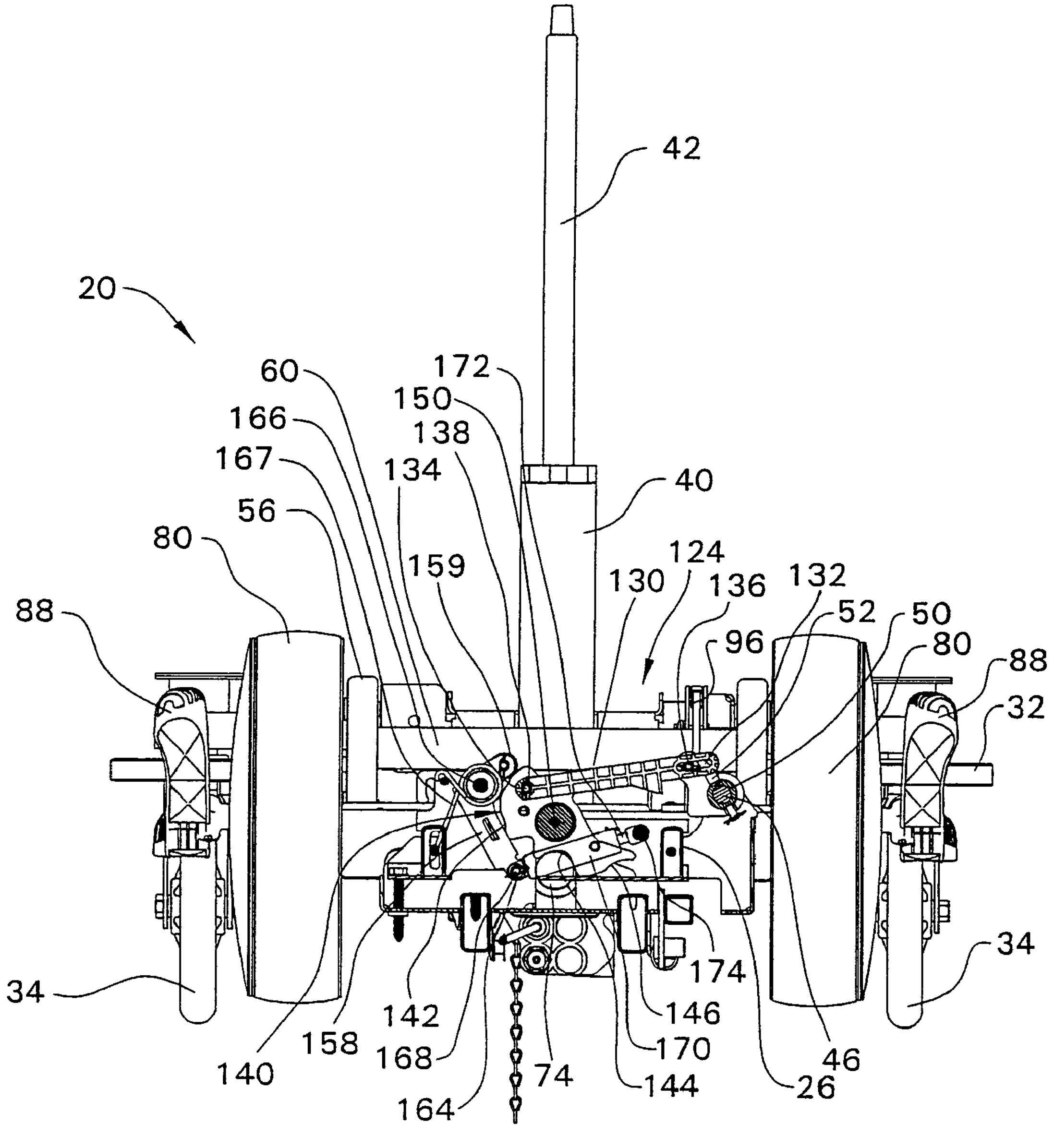
FIG. 5 is a cross-sectional view of the wheeled carriage taken along the line 5—5 in FIG. 2 and illustrating the cam apparatus in the brake position.

The two part longitudinally oriented control shaft 46 that extends the length of the wheeled base 22 includes a longitudinal control shaft collar 50 as illustrated in FIG. 5 for joining the two parts together. A longitudinal control shaft link 52 is an integral feature of and extends outwardly from the longitudinal control shaft collar 50.

Auxiliary Wheel Support Structure

Figure 2:
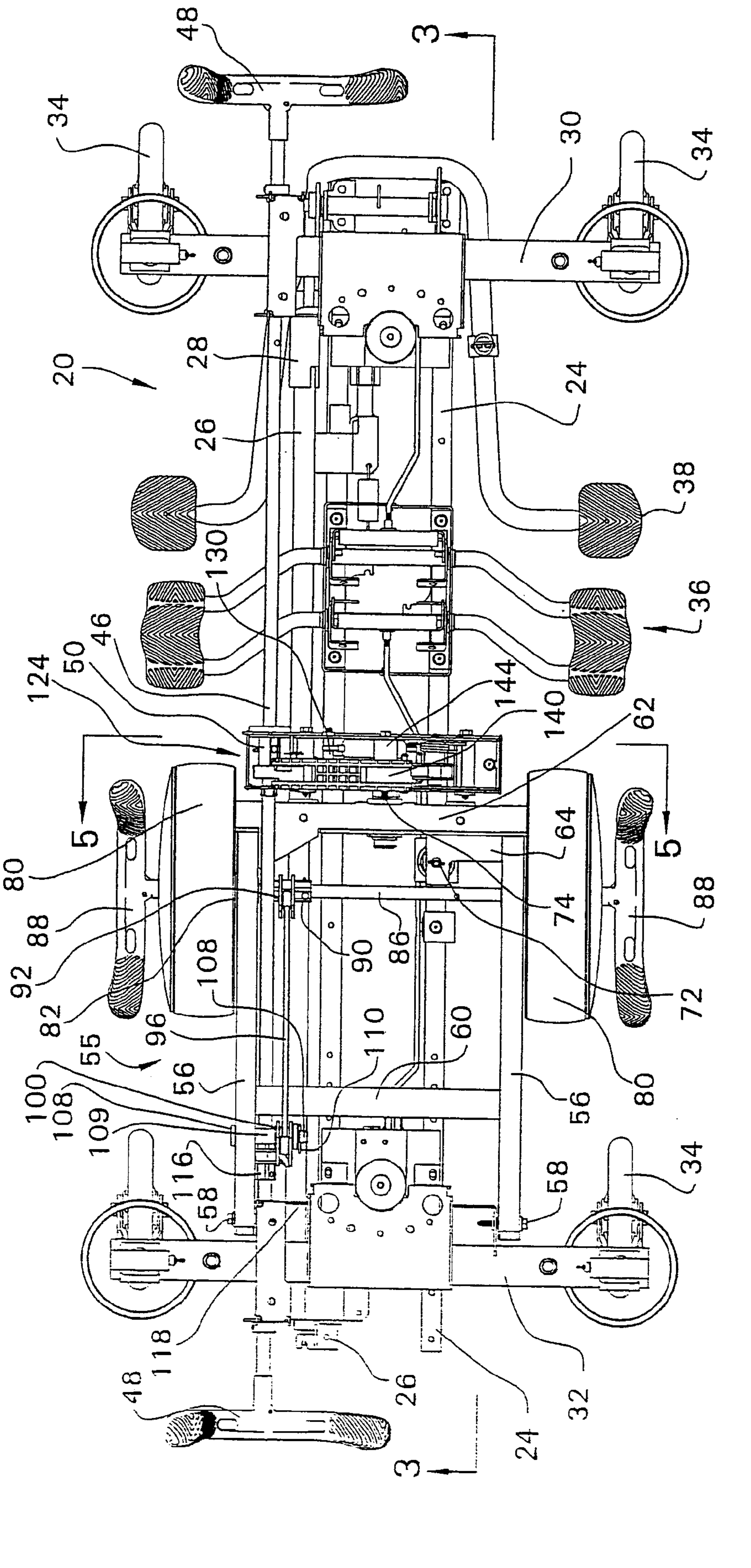
FIG. 2 is a top view of the wheeled carriage with the auxiliary wheels stowed and the carriage in the braked condition.

The top view of FIG. 2 illustrates the auxiliary wheel support structure 55. The auxiliary wheel support structure 55 includes spaced elongate and parallel support bars 56 each pivotably connected at one end to the wheeled base 22 by fasteners 58. An elongate upper cross piece 60 is positioned transverse to the parallel support bars 56 and the ends thereof secured to the parallel support bars 56. Ends of an elongate lower cross piece 62 are secured near the opposing ends of the parallel support bars 56 that are remote from the fasteners 58.

Figure 3:
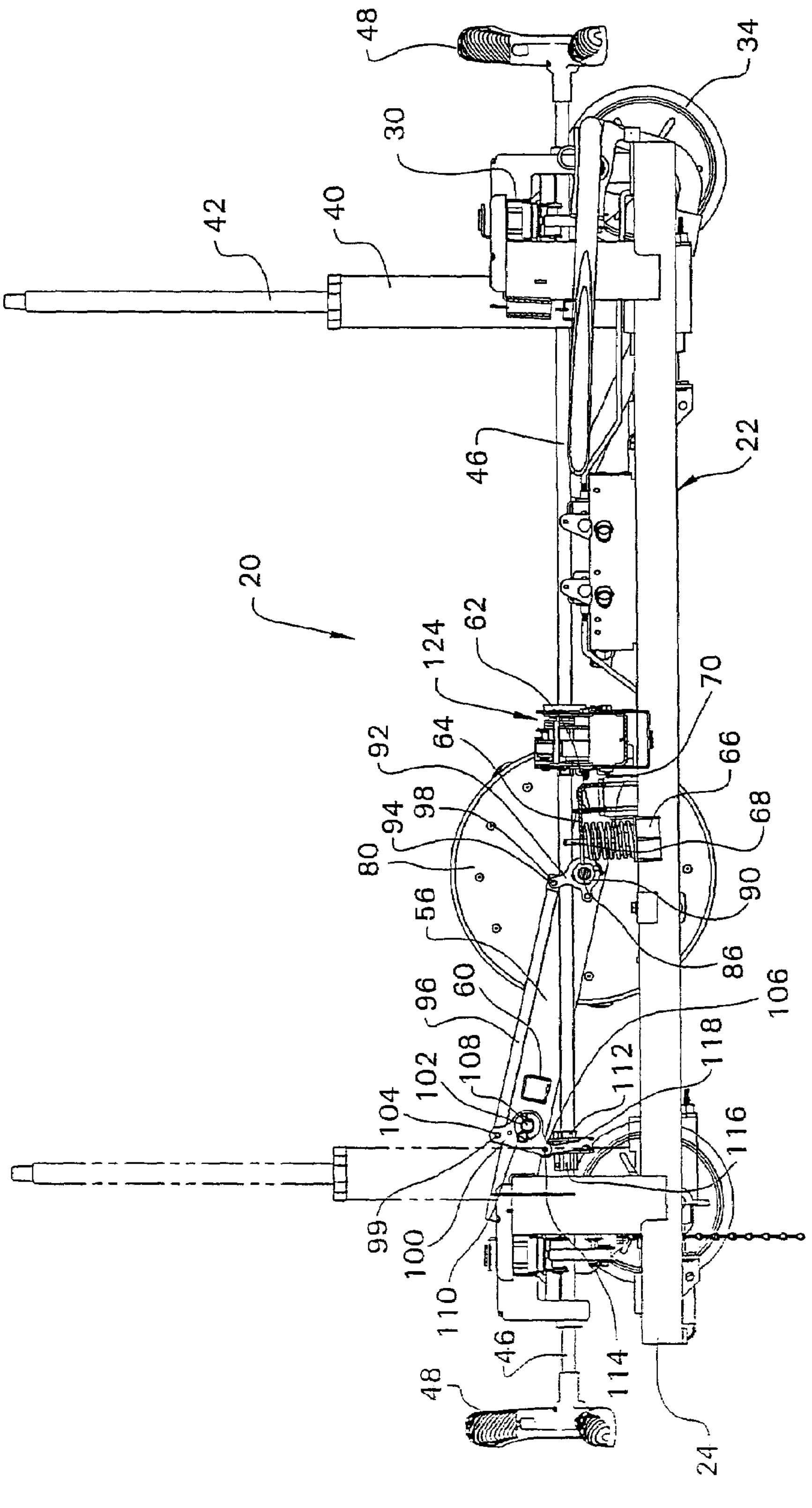
FIG. 3 is a cross sectional side view of the wheeled carriage taken along the line 3—3 in FIG. 2 and with a hydraulic jack represented by dashed lines.

A spring support plate 64 is an integral feature of the lower cross piece 62 and/or one of the elongate support bars 56. FIG. 3 shows a cross sectional view illustrating the relationship between the lower cross piece 62 and the spring support plate 64. FIG. 3 further shows a frame spring support element 66 secured to the elongate support bar 24 of the wheeled base 22. A clevis pin 68 is positioned and is secured to the frame spring support element 66 and extends upwardly therefrom in substantially vertical alignment to and beyond the spring support plate 64.

Figure 8:
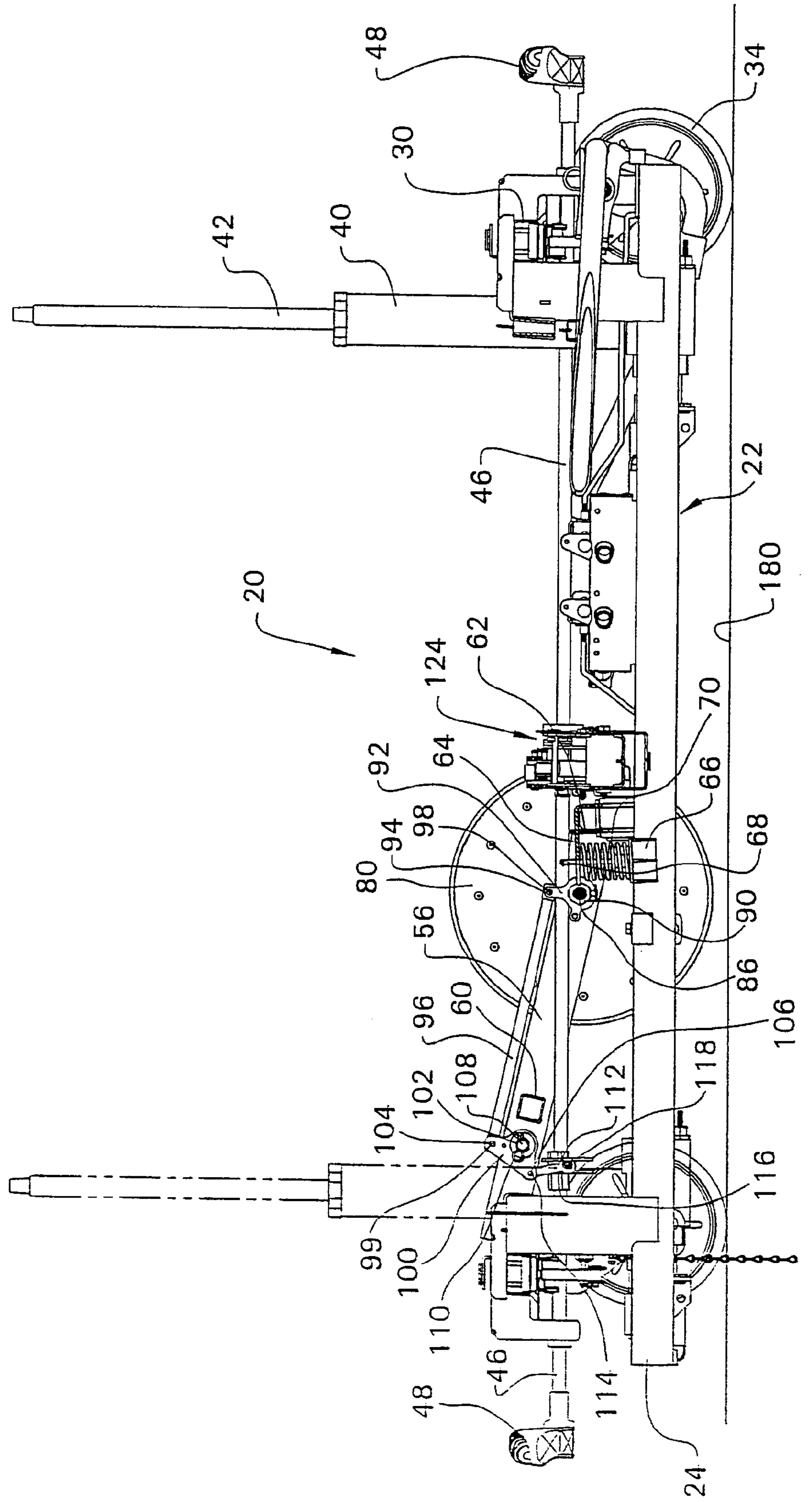
FIG. 8 is a cross sectional side view of the wheeled carriage taken along the line 8—8 in FIG. 7 and with a hydraulic jack represented by dashed lines.
Figure 9:
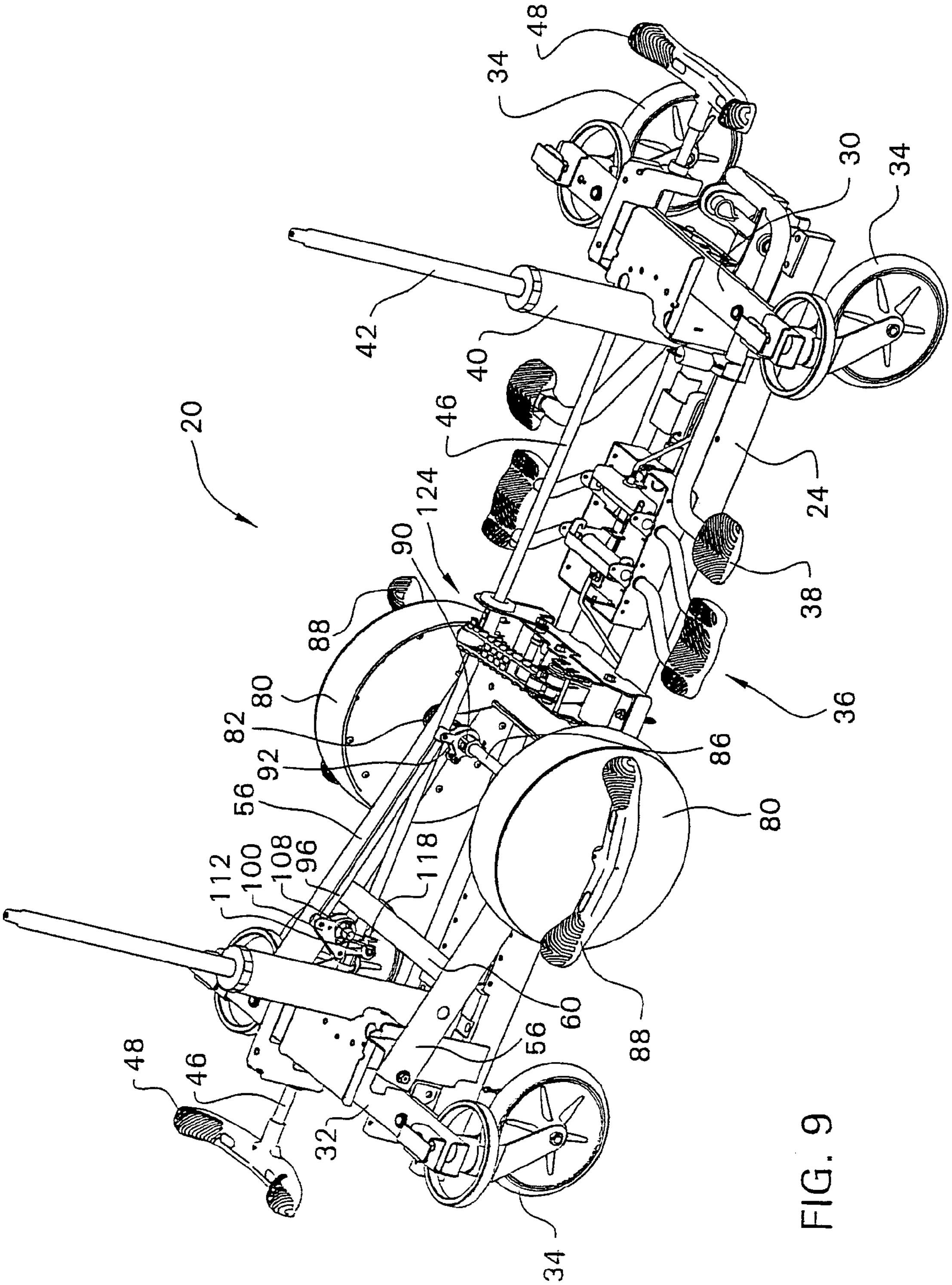
FIG. 9 is a further isometric view of the wheeled carriage in the neutral condition and the auxiliary wheels in the stowed position.

A substantially vertically oriented auxiliary wheel biasing spring 70 is positioned between the spring support plate 64 and the frame spring support element 66. The auxiliary wheel biasing spring 70 has coils that define an axis corresponding to an axis defined by the length of the spring mounting rod 68. A rue ring 72 shown in FIG. 2 is secured to a top end of the clevis pin 68. The spring support plate 64 is movable relative to the clevis pin 68 to the position illustrated in FIG. 13. As shown in FIGS. 3 and 8, the auxiliary wheel biasing spring 70 urges the auxiliary wheel support structure 55 and auxiliary wheels into the raised or stowed position.

FIG. 2 illustrates a cam follower 74 rotatably secured in not illustrated bearings to the lower cross piece 62 of the auxiliary wheel support structure 55. Part of the cam follower 74 projects inwardly toward the geometric center of the wheeled carriage 20 in a generally horizontal direction.

Spaced auxiliary wheels 80 (FIG. 2) include central apertures that are axially aligned with each other. The auxiliary wheels 80 are uncastered. Auxiliary wheel support bearing devices 82 are fitted into apertures of the parallel support bars 56 that are aligned with each other. The support bearing devices 82 rotatably mount the auxiliary wheels 80 adjacent the ends of a transversely oriented control shaft 86. Thus the auxiliary wheels 80 rotate independently of the transversely oriented control shaft 86. The transversely oriented control shaft 86 is also rotatable relative to the aligned apertures of the parallel support bars 56. Each of the auxiliary wheel support bearing devices 82 are designed to prevent movement of the plane of rotation of each of the respective auxiliary wheels 80 out of parallel alignment with a vertical plane defined at the longitudinal axis of the patient support deck 44. The auxiliary wheel support bearing devices 82 are well known in the art and the structure will not be described in detail.

Manipulative members, such as auxiliary wheel side foot pedals 88 are secured to opposing ends of the transversely oriented control shaft 86.

Linkage

Figure 4:
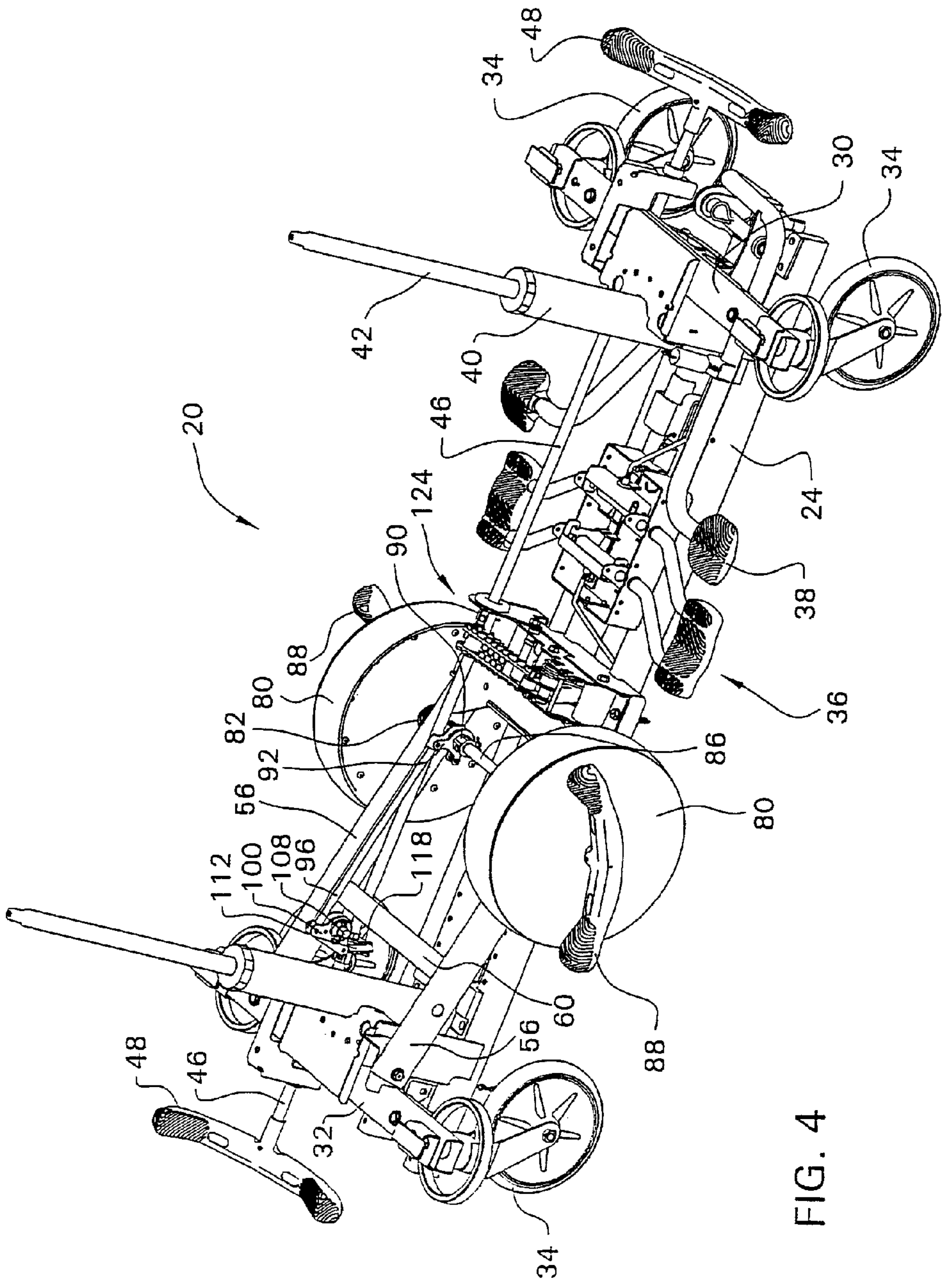
FIG. 4 is a further isometric view of the wheeled carriage in the braked condition and the auxiliary wheels in the stowed position.

FIG. 3 illustrates a hex shaped collar 90 secured by a pin to the transverse control shaft 86 at a location that is inwardly from and adjacent one of the parallel support bars 56. FIGS. 3 and 4 illustrate an auxiliary wheel link element 92 having a hub and outwardly projecting parallel plates. The parallel plates have link end apertures 94 aligned with each other. The link element 92 is weldably secured to the collar 90. One end of an elongate link bar 96 is positioned between the parallel plates and pivotably attached therebetween by a link bar pin 98 that extends through the lower link end apertures 94 and an aperature in the link bar.

A transfer member 100 has a hub and spaced plates projecting outwardly therefrom. The hub of the transfer member 100 includes a support aperture 102. The spaced plates to the transfer member 100 include transfer member link apertures 104 aligned with each other. The space plates of the transfer member 100 also include spaced motion transfer apertures 106 aligned with each other.

A transfer pin 108 extends through the transfer member support aperture 102 and a corresponding aperture near an upper end of the adjacent support bar 56 to rotatably attach the transfer member 100 to the support bar. The pin 108 includes a hollow spacer element 109 located between the support bar 56 and the transfer member 100 also receives the transfer pin 108 and assists in maintaining a predetermined distance between the support bar 56 and the link bar 96 as shown in FIG. 2. A rue ring 110 locks the transfer pin 108 in place.

The other end of the elongate link bar 96 is pivotably attached to the transfer member 100 by a link bar pin 99 extending through the apertures 104. In this arrangement the link bar 96 is oriented transversely with respect to the transverse control shaft 86.

A swivel rod member 112 having an end aperture is rotatably attached to the transfer member 100 by a swivel rod connector 114 that is inserted through the motion transfer apertures 106.

A swivel joint collar 116 is secured at a position on the longitudinally oriented control shaft 46 that is adjacent to the transfer member 100. A swivel joint 118 is secured to the swivel joint collar 116. A second end of the swivel rod member 112 has an expanded portion that is received in an opening in the swivel joint 118. Substantially linear movement of the swivel rod member 112 is translated into rotation of the longitudinally oriented two part control shaft 46 by the swivel joint 118. The swivel joint arrangement is a well known coupling arrangement for translating substantially linear motion into rotation of a shaft.

Cam Apparatus

FIG. 5 illustrates a cam apparatus 124 for controlling the position of the auxiliary wheels 80. A cam member 140 is rotatably secured to a part of the wheeled base 22 by a cam pivot device 150. The cam member includes a first cam surface segment 142, a second cam surface segment forming a cam brake/neutral depression 144 and a third cam surface segment forming a cam deployment depression 146. The cam member 140 is located in a substantially vertically oriented plane transverse to the longitudinal axis of the wheeled carriage 20.

The cam apparatus 124 includes a cam transfer link 130 having a cam transfer slot 132 adjacent one end thereof and a cam transfer link aperture 134 positioned at the opposing end thereof. A control shaft link pin 136 inserted through the cam transfer link slot 132 pivotably connects the longitudinal control shaft link 52 to the cam transfer link 130. Another pivot pin 138 inserts through the cam transfer link aperture 134 to connect the cam member 140 and the cam transfer link 130.

The cam apparatus 124 also includes a cam controller 158. The cam controller 158 is rotatably movable about a cam controller pivot device 166 to define a plane that is transverse to the longitudinal axis of the wheeled carriage 20. The cam controller 158 has a cam control roller 159 at first end for contacting the first cam controller contact surface segment 142 of the cam member 140. A cam controller torsion spring 167 biases the cam control roller 159 into contact with and against the first cam controller contact surface segment 142. The cam controller 158 has a second end that includes a pin 164.

As shown in FIG. 5, the pin 164 is received in a cam controller-pot end connector 168 to pivotally connect the second end of the cam controller 158 to an end of a dash pot 170. A dash pot rod 172 projecting from an opposing end of the dash pot 170 is attached to the wheeled carriage 20 at a fixing point 174.

A similar type of cam apparatus is disclosed in U.S. Pat. No. 6,256,812 which is incorporated by reference earlier.

Brake Apparatus

A brake engagement apparatus for connection to the longitudinally oriented control shaft 46 is disclosed in U.S. Pat. No. 6,820,294 previously incorporated by reference and thus not discussed herein. The brake engagement apparatus disclosed in the 294 patent controls locking and unlocking of the castered wheels 34 in response to rotation of the longitudinally oriented control shaft 46.

Wheeled Carriage Positions

Figure 13:
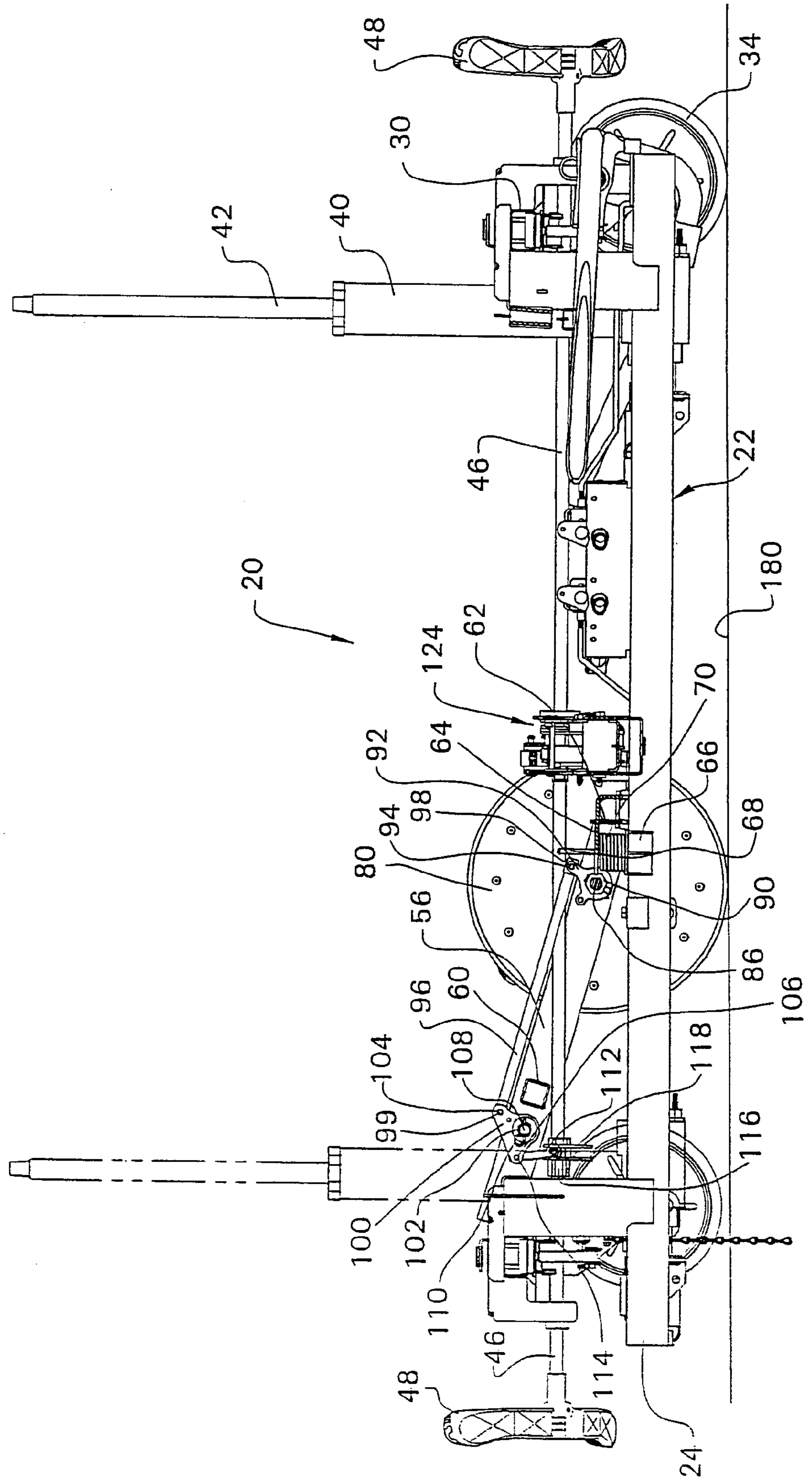
FIG. 13 is a cross sectional side view of the wheeled carriage taken along the line 13—13 in FIG. 12 and with a hydraulic jack represented by dashed lines.

End foot pedals 48 and side foot pedals 88 of the wheeled carriage 20 control the wheeled carriage between three different states. FIGS. 1–5 illustrate the wheeled carriage 20 in the braked condition wherein the castered wheels are not rotatable and the auxiliary wheels 80 are in a stowed position. FIGS. 6–10 illustrate the wheeled carriage 20 in a neutral condition. In the neutral condition, the auxiliary wheels 80 remain in a stowed position, but the castered wheels 34 are freely rotatable. FIGS. 11–15 illustrate the auxiliary wheels 80 in the engaged or deployed position. As shown in FIG. 13, the auxiliary wheels 80 extend downwardly into contact with a floor surface 180 while raising a pair of the castered wheels 34 on the end of the wheeled carriage 20 closest to the auxiliary wheels.

Transferring the Wheeled Carriage From a Braked Condition to a Neutral Condition Using the End Foot Pedals FIG. 1 illustrates the wheeled carriage 20 in the braked condition. To shift the wheeled carriage 20 to a neutral condition, an operator applies force to the upwardly turned end of a selected one of the end foot pedals 48. The end foot pedal 48 rotates to an even horizontal position illustrated in FIG. 6. Of course, as will be discussed later, rotation of a selected one of the side foot pedals 88 results in the rotation of the longitudinally oriented control shaft 46 extending the length of the wheeled carriage 20.

Figure 10:
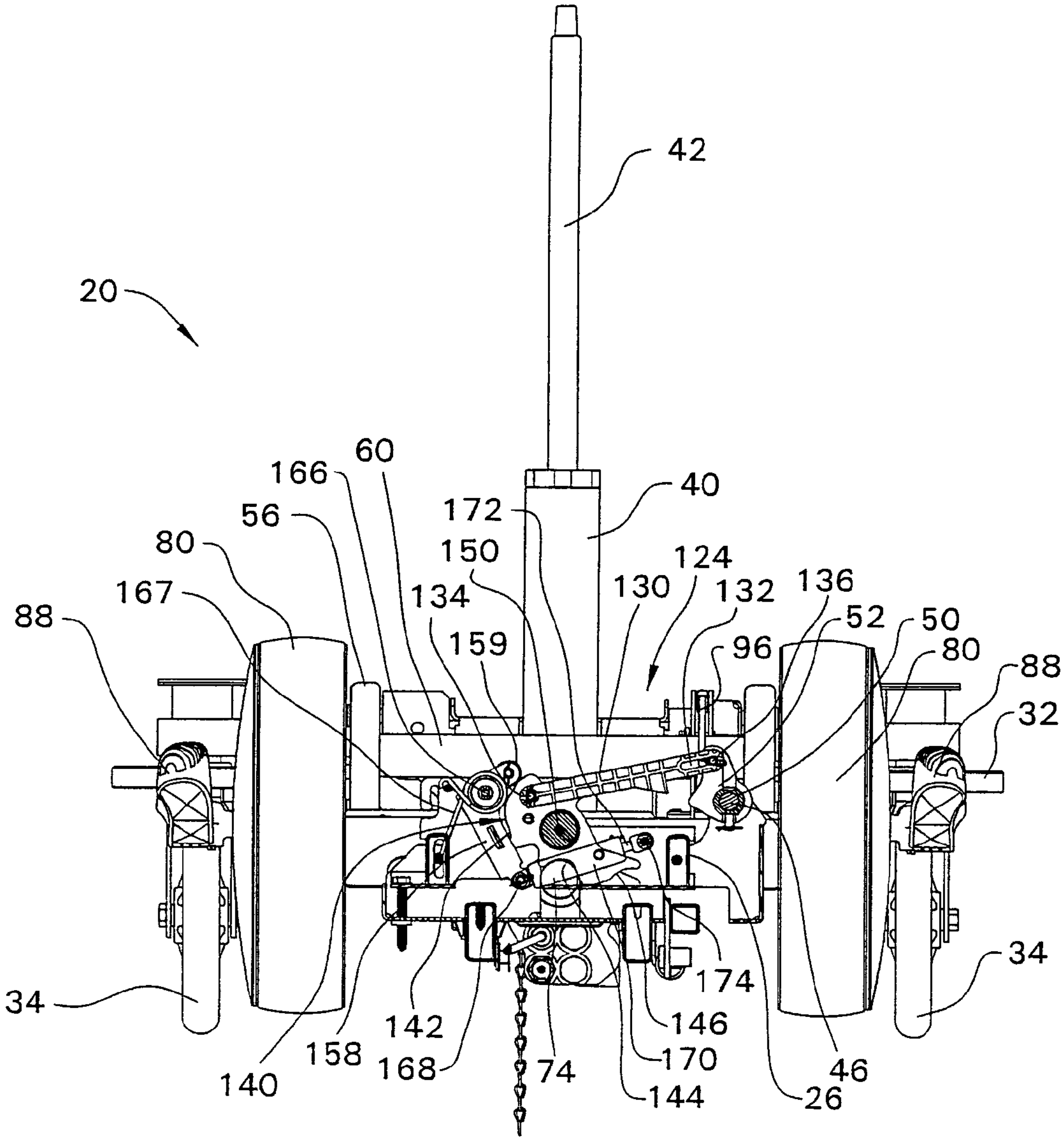
FIG. 10 is a cross sectional view of the wheeled carriage taken along the line 10—10 in FIG. 7 and illustrating the cam apparatus in a neutral position.

The rotation of the longitudinally oriented shaft 46 also rotates the longitudinal shaft collar 50 and longitudinal control shaft link 52 from the position illustrated in FIG. 5 to the position illustrated in FIG. 10. The length of the cam transfer link slot 132 of the cam transfer link 130 enables the control shaft link pin 136 to move within the cam transfer link slot so that the cam member 140 remains stationary despite the rotation of the longitudinally oriented shaft 46. Thus, the cam follower 74 remains in the cam brake/neutral depression 144. Therefore, the auxiliary wheels 80 remain in the stowed position.

Deployment of the Auxiliary Wheels by the End Foot Pedals

Figure 6:
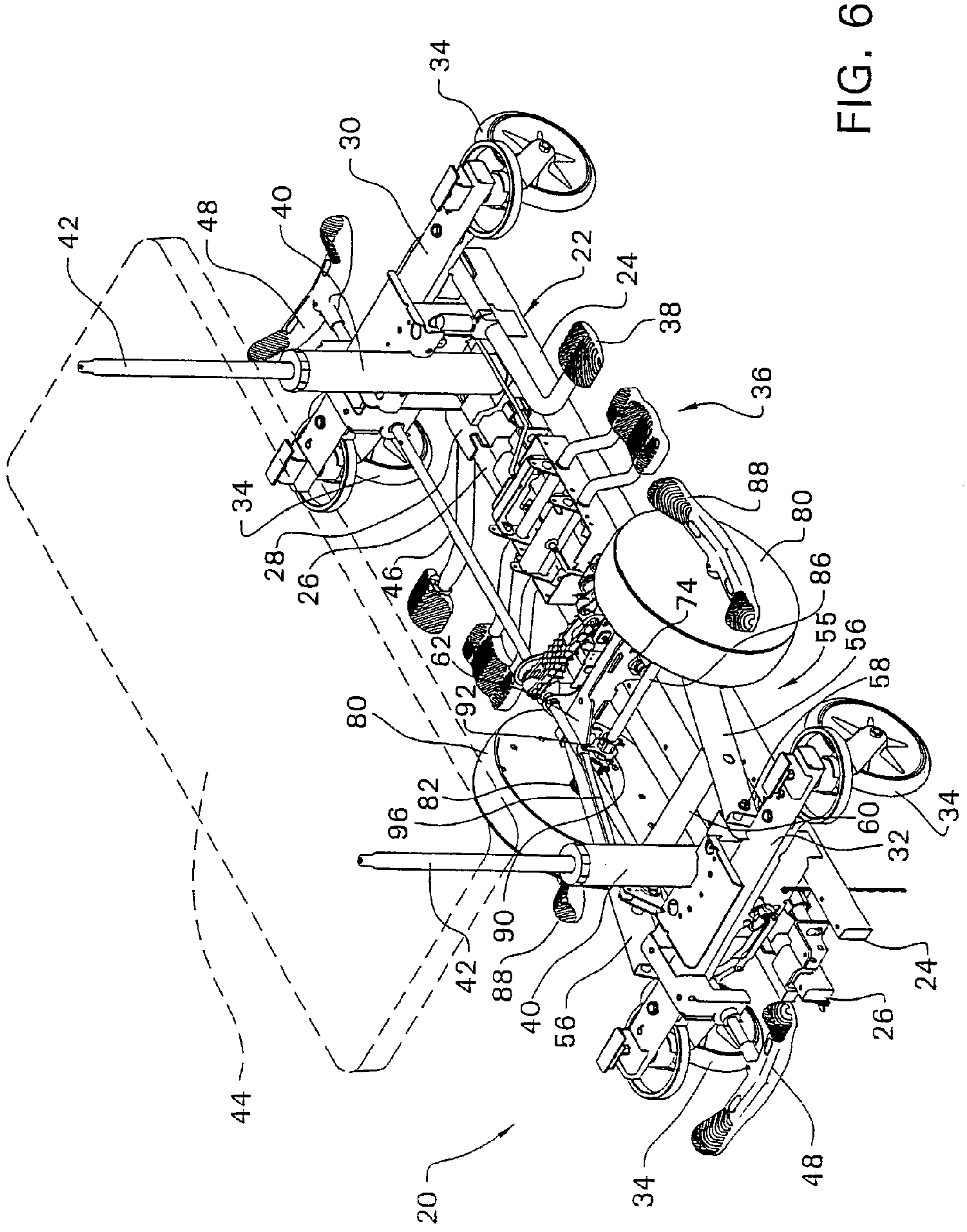
FIG. 6 is an isometric view of the wheeled carriage of FIG. 1 in a neutral condition and the auxiliary wheels in the stowed position.
Figure 7:
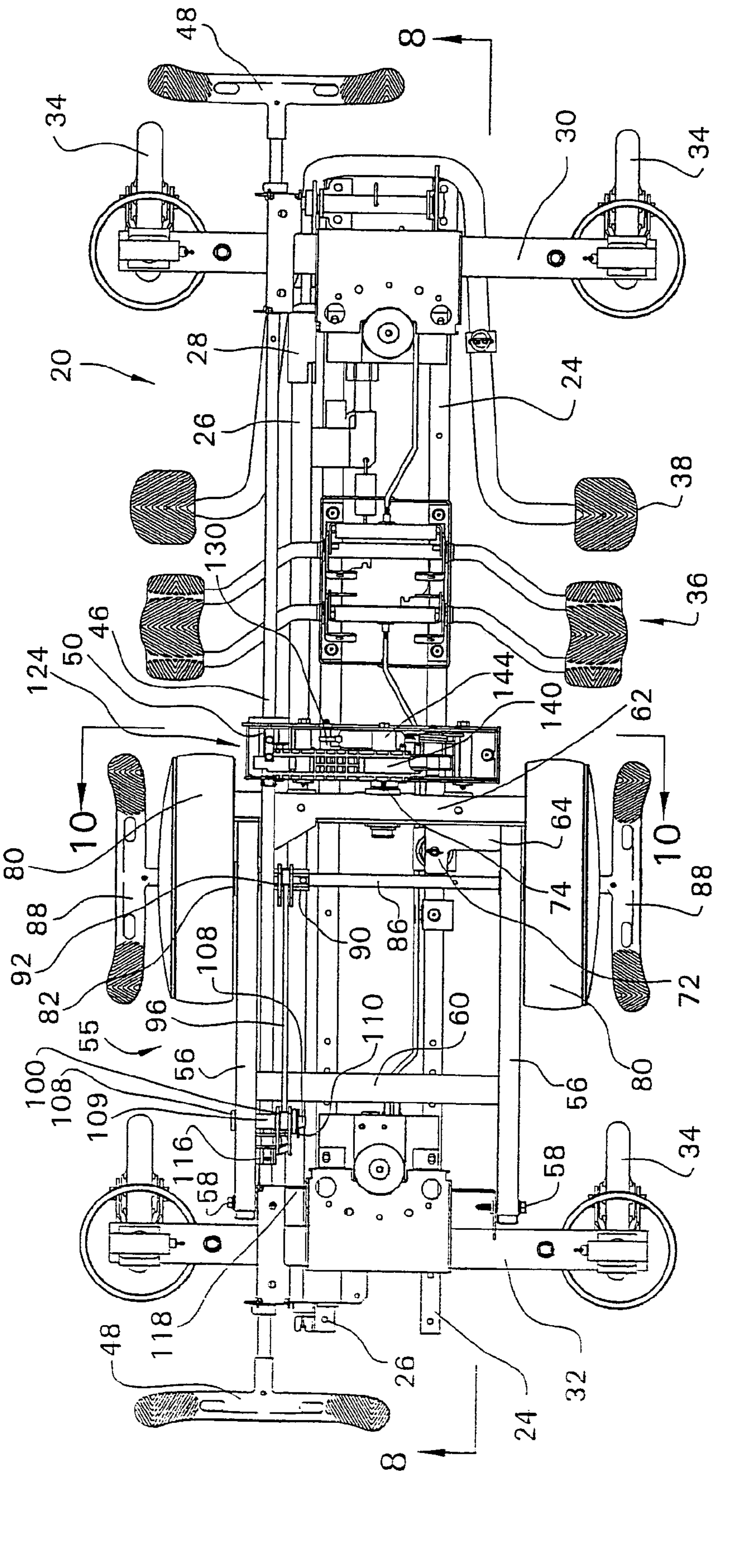
FIG. 7 is a top view of the wheeled carriage with the auxiliary wheel stowed and the wheeled carriage in the neutral condition.
Figure 11:
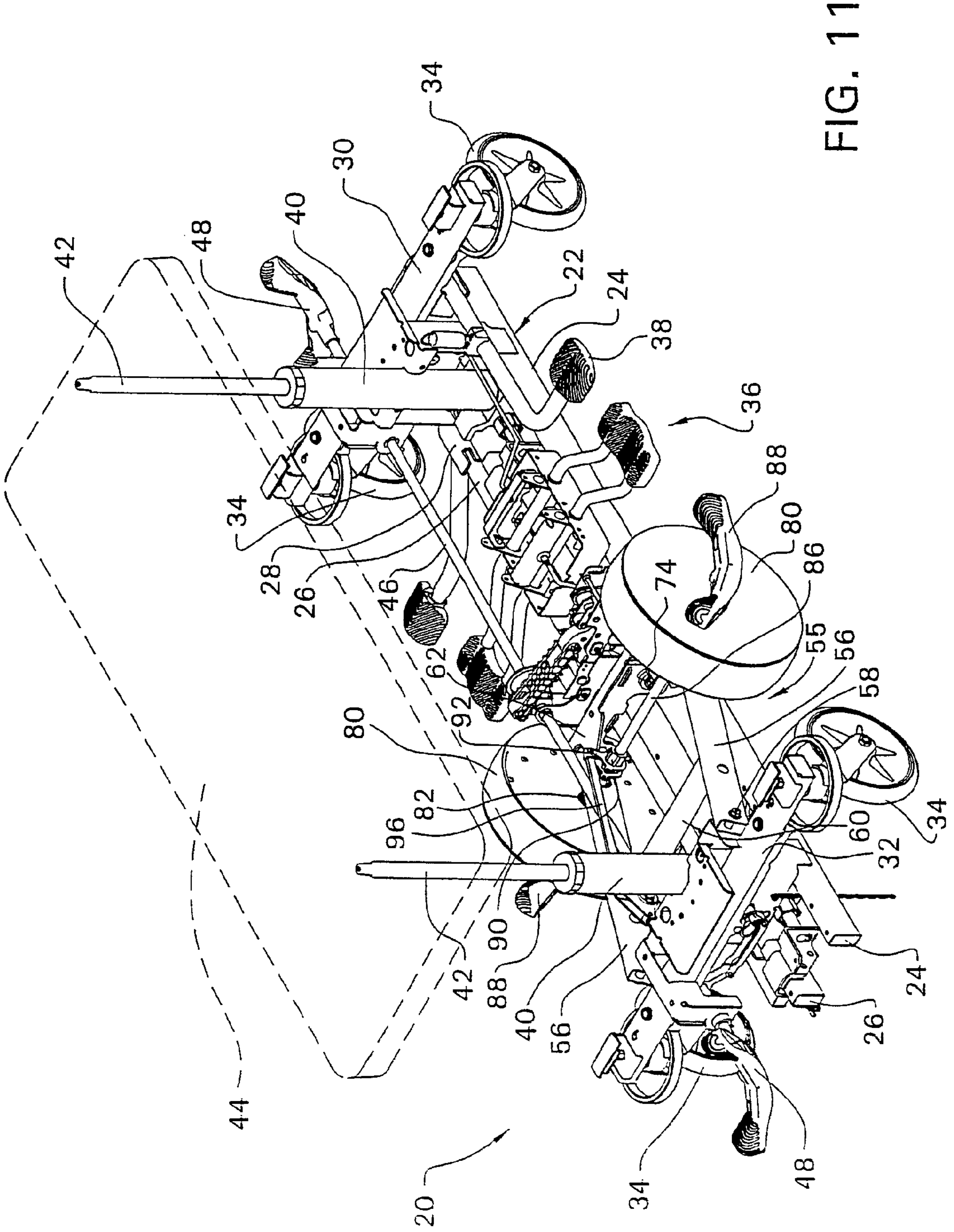
FIG. 11 is an isometric view of the wheeled carriage of FIG. 1, with the auxiliary wheels in a deployed position engaging a floor surface and certain castered wheels closest thereto lifted away from the floor.
Figure 12:
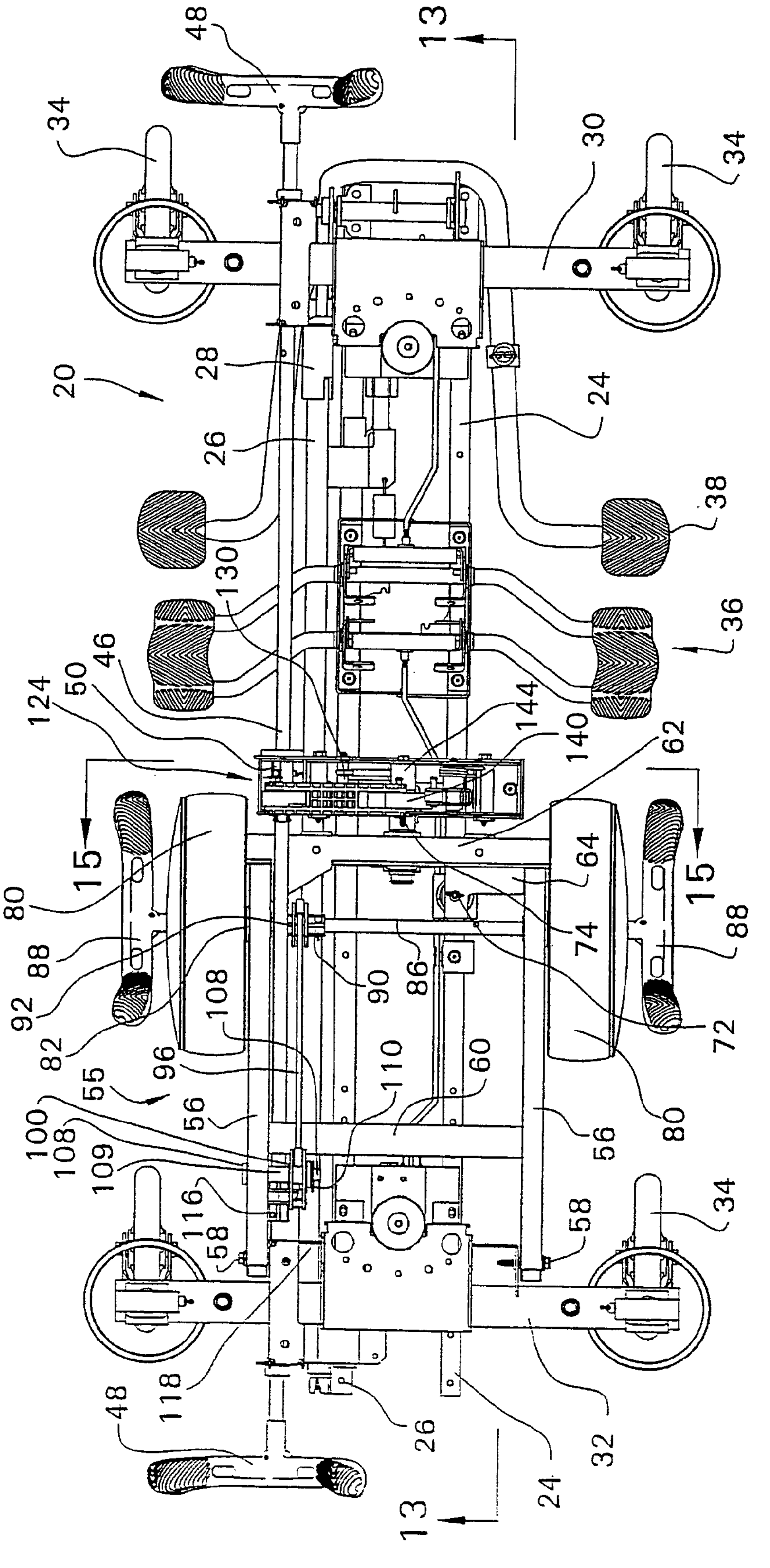
FIG. 12 is a top view of the wheeled carriage with the auxiliary wheels in the deployed position.

The auxiliary wheels 80 are deployed by applying force to the outwardly directed end of a selected one of the end foot pedals 48 shown in FIG. 6 to rotate the longitudinally oriented control shaft 46 from the neutral position to the engaged position shown in FIG. 11. In FIG. 11, the lowered end of the foot pedal is located at the outward edge of the wheeled carriage 20.

Figure 15:
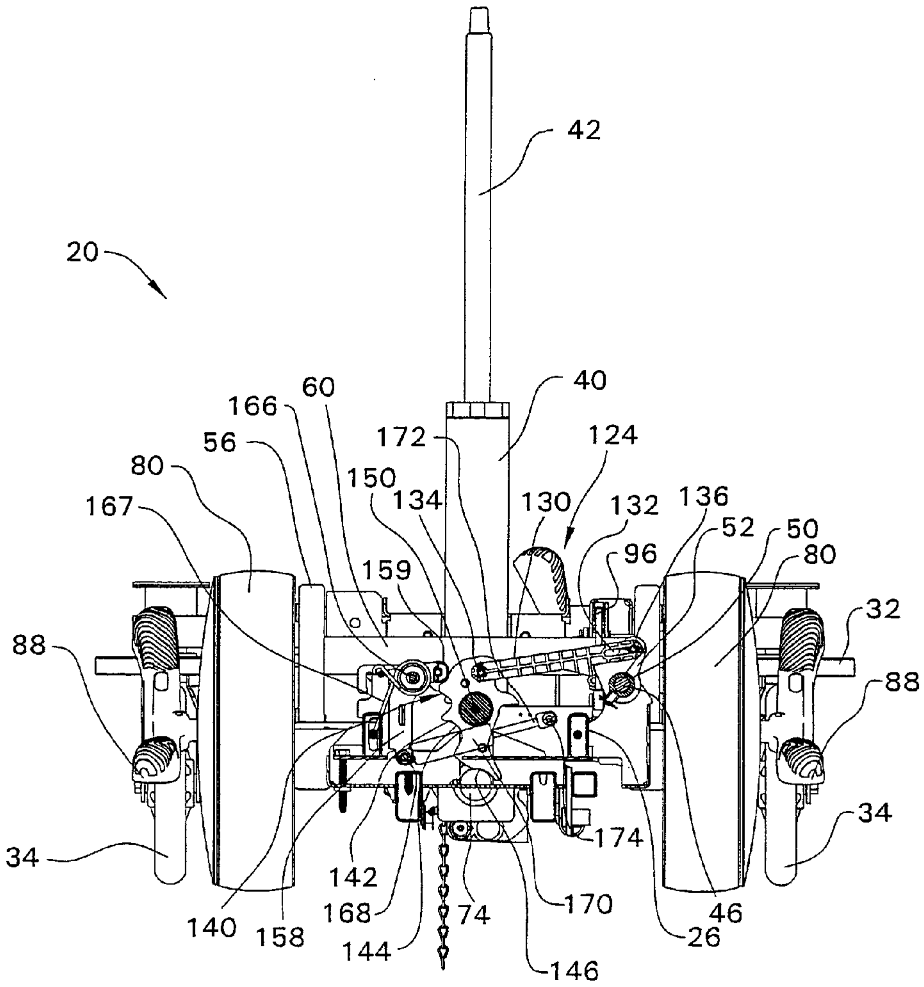
FIG. 15 is a cross sectional view of the wheeled carriage taken along the line 15—15 in FIG. 12 and illustrating the cam apparatus when the auxiliary wheels are deployed.

As illustrated in FIG. 10, the rotation of the longitudinally oriented control shaft 46 to the engaged position operates on the cam apparatus 124 as follows. The longitudinally oriented control shaft 46 pivots the control shaft link 52, which moves the cam transfer link 130 attached at one end in a substantially linear path. The other end of the cam transfer link 130 rotates the cam member 140 about the cam pivot device 150. Rotation of the cam member 140 moves the cam follower 74 from the cam brake/neutral depression 144 downwardly along the cam surface until the cam follower 74 is positioned in the cam deployment depression 146 as shown in FIG. 15. The downward movement of the cam follower 74 also pivots the auxiliary wheel support structure 55 downwardly so that the auxiliary wheels 80 are deployed against the floor surface 180 as shown in FIGS. 13 and 15.

When the cam member 140 is rotating clockwise from the position shown in FIG. 10 to the position shown in FIG. 15, the cam controller torsion spring 167 pivots the cam controller 158 to maintain the cam control roller 159 in contact with the first cam controller contact surface portion 142 of the cam surface and to effect a pulling of the rod 172 of the dash pot 170 outwardly from the body thereof. Therefore, the cam controller 158 ensures a smooth transition for the wheeled carriage 20 between the deployed condition and the neutral condition.

As shown in FIGS. 3 and 8, the auxiliary wheel biasing spring 70 pushes against the auxiliary wheel spring support plate 64 to urge the auxiliary wheels 80 into the stowed position. When the auxiliary wheels 80 are being deployed by the downward movement of the auxiliary wheel support structure 55, the auxiliary wheel biasing spring 70 resists the downward movement. When the cam follower 74 reaches the cam deployment depression 146, the cam member 140 maintains the auxiliary wheel support structure 55 in a lowered position. Thus the auxiliary wheels 80 are in the deployed position and the auxiliary wheel biasing spring 70 is compressed as illustrated in FIG. 13. The auxiliary wheel biasing spring prevents the auxiliary wheels 80 from engaging the floor when the cam follower 74 is received in the brake/neutral depression 144.

The auxiliary wheels 80 can be returned from the deployed position shown in FIGS. 11–15 to the stowed position shown in FIGS. 6–10. During stowing of the auxiliary wheels 80, the cam controller 158 and the attached dash pot 170 ensure that there is not a sudden movement of the cam follower 74 along the cam surface when the auxiliary wheel biasing spring 70 raises the auxiliary wheels 80 as follows.

The operation of the cam apparatus 124 for stowing the auxiliary wheels 80 is as follows. When the cam member 140 rotates counterclockwise from the position shown in FIG. 15 to the position shown in FIG. 10, the cam controller 158 is also forced to pivot counterclockwise. As the cam member 140 rotates, the cam follower 74 moves against the cam surface and then moves upwardly into the cam brake/neutral depression 144. As the cam controller 158 pivots, the dash pot rod 172 moves into the dash pot 170. The dash pot 170 prevents or resists sudden movement of the dash pot rod 172 therein. This resistance limits the rotational speed of the cam controller 158 and the cam member 140 so that the cam follower 74 does not move too quickly into the brake/neutral depression. Thus in stowing the auxiliary wheels 80, the raised castered wheels 34 of the wheeled carriage 20 will not suddenly drop downwardly hitting the floor surface 180 with a jolt. Thus, the cam controller 158 limits the rate of descent of the heretofore lifted wheels 34 of the wheeled carriage 20 as the auxiliary wheels 80 are moved to the stowed position.

As discussed above, further rotation of a selected one of the end foot pedals 48 rotates the longitudinally oriented control shaft 46 to the brake position. The length of the cam transfer link slot 132 permits this rotation of the longitudinal control shaft 46 from the neutral position to the brake position with essentially no movement of the cam member 140.

Deployment of the Auxiliary Wheels Utilizing the Transversely Oriented Control Shaft As in U.S. Pat. No. 6,240,579 incorporated by reference earlier, the auxiliary wheel side foot pedals 88 are linked to the end foot pedals 48. Thus, movement of the end foot pedals 48 translates into movement of the side foot pedals 88 and vice versa.

The side foot pedals 88, however, are linked in an entirely different manner than in the U.S. Pat. No. 6,240,579 patent. The side foot pedals 88 travel with the auxiliary wheels 80 and the auxiliary wheel support structure 55.

Operation of one of the auxiliary wheel side foot pedals 88 from the brake position shown in FIGS. 1–5 to the neutral position shown in FIGS. 6–10 is as follows. Actuation of the side foot pedal 88 rotates the transversely oriented control shaft 86 from the position shown in FIG. 3 to the position shown in FIG. 8. This rotation of the transversely oriented control shaft 86 moves the link bar 96 in a substantially linear direction. The end of the link bar 96 attached to the link bar pin 99 pivots the transfer member 100 about its axis. The pivoting motion of the transfer member 100 moves the swivel rod member 112 that is pivotably attached to a separate end of the transfer member 100 substantially upwardly. The other end of the swivel rod member 112 within the swivel joint 118 pulls the swivel joint upwardly and rotates the longitudinally oriented shaft 46. Thus, the swivel joint arrangement translates the rotational and translational movement of the transversely oriented control shaft 86 into a rotating movement of the longitudinally oriented control shaft 46. As discussed above, the rotation of the longitudinally oriented control shaft 46 releases the brakes for the wheeled carriage 20 so that the wheeled carriage is in the neutral position.

Figure 14:
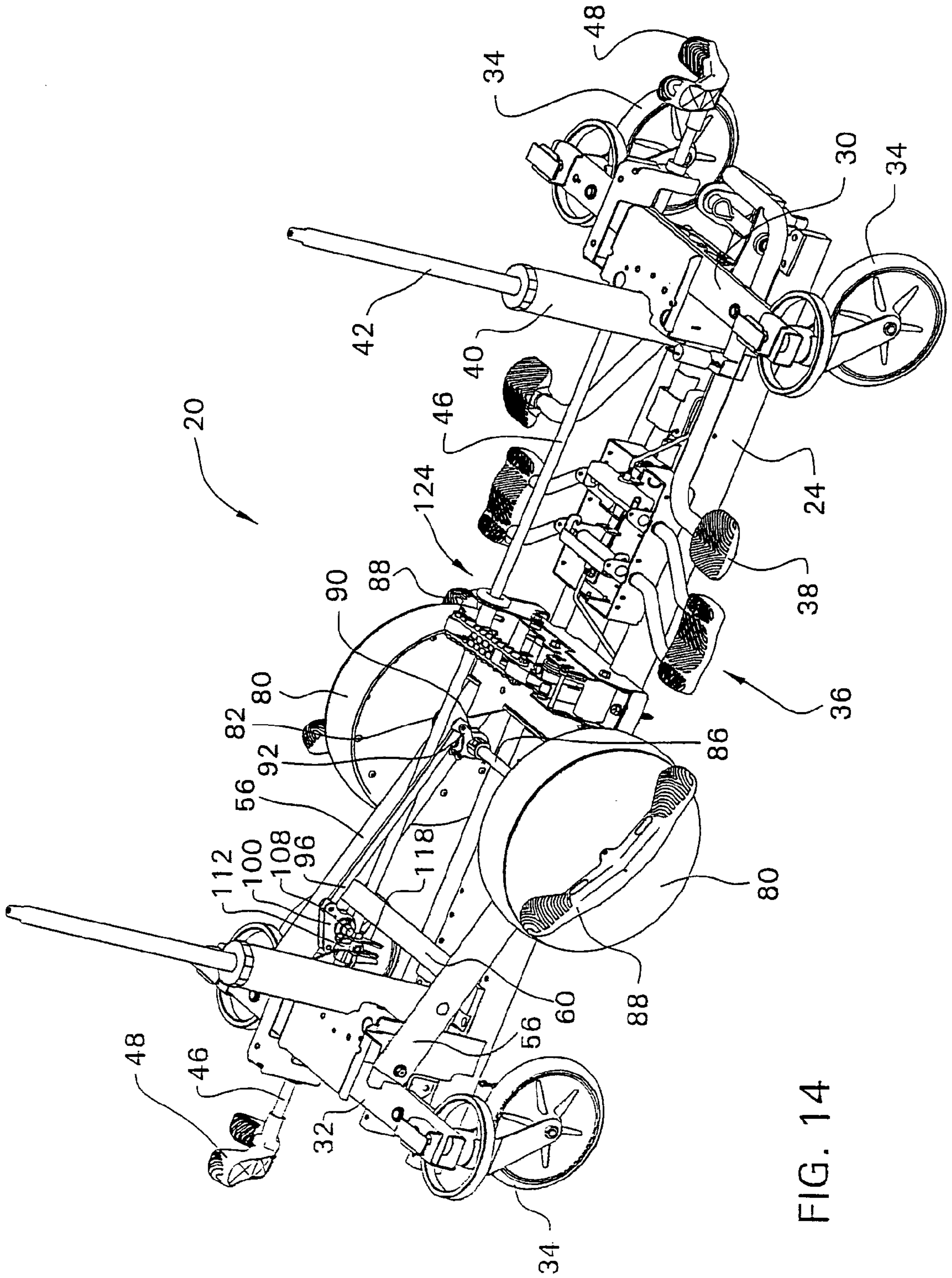
FIG. 14 is a further isometric view of the wheeled carriage in the deployed position.

Additional application of a force to the right end of the side foot pedal 88 moves the side foot pedal to the position shown in FIG. 14. This movement rotates the transversely oriented control shaft 86 and moves the link bar 96 to the position shown in FIG. 13. The link bar 96 rotates the transfer member 100 so that the swivel rod member 112 again moves farther upwardly so that the swivel joint 118 causes further rotation of the longitudinally oriented control shaft 46. This further rotation of the longitudinally oriented control shaft 46 controls the cam apparatus 124 as discussed above, to deploy the auxiliary wheels 80.

The force applied to the side foot pedal 88 by an operator during deployment of the auxiliary wheels 80 includes a rotative force component and a downward force component. The downward force component assists in the deployment of the auxiliary wheels 80 by direct application of the operator's weight against the resistive force of the auxiliary wheel biasing spring 70. This direct application of an operator's weight provides easier deployment of the auxiliary wheels 80 than deployment utilizing only a rotative force applied to the foot pedal 88.

Other embodiments of the invention are also contemplated. For example, while the disclosed cam apparatus 124 is preferred, a different type of cam apparatus or other linkage arrangement may be utilized to deploy the auxiliary wheels 80. On the other hand, the transfer member 100 can be pivotally mounted to structure on the base 22.

While a pair of auxiliary wheels 80 are illustrated, a single auxiliary wheel or more auxiliary wheels are contemplated. While four castered wheels 22 are shown, a greater or lesser number are also contemplated.

While screws, bolts, pins, nuts, connectors and fasteners are disclosed, any type of joining members may be utilized to join elements pivotably, rotatably or otherwise.

The invention contemplates raising two castered wheels 34 at the end of the wheeled carriage 20 closest to the auxiliary wheels 80. However, in other embodiments, the castered wheels 34 may remain in contact with the floor surface 180 while the auxiliary wheels 80 are, or at least one auxiliary wheel is, engaged against the floor surface.

Although particular preferred embodiments of the invention have been discussed in detail for illustrative purposes, it will be recognized that variations or modifications of the disclosed apparatus, including the rearrangement of parts, lie within the scope of the present invention.

We claim:

1. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another;

an auxiliary wheel support structure secured to said wheeled base and supporting at least one auxiliary wheel about an axis transverse to the length of said wheeled base, wherein said auxiliary wheel support structure is configured to enable movement of said at least one auxiliary wheel and to support said at least one auxiliary wheel in a first deployed position and in a second stowed position; and a control apparatus for controlling said auxiliary wheel support structure to move said at least one auxiliary wheel between at least the first deployed position whereat said at least one auxiliary wheel is in contact with a floor surface, and the second stowed position whereat said at least one auxiliary wheel is out of engagement with the floor surface, said control apparatus including at least one manipulative member connected to a transverse control shaft, the transverse control shaft being connected to said auxiliary wheel support structure, said transverse control shaft being lowered relative to the wheeled base during lowering movement of said at least one auxiliary wheel to the deployed position and moved relative to the wheeled base during upward movement of said at least one auxiliary wheel to the stowed position.

2. The wheeled carriage of claim 1, wherein said transverse control shaft is rotatably secured to said auxiliary wheel support structure and said at least one manipulative member connected to said control shaft comprises a laterally oriented manipulative member fixedly secured to an end of and rotatable with said transverse control shaft, said laterally oriented manipulative member being located at one of the pair of lateral sides intermediate the head and foot ends of the wheeled carriage.

3. The wheeled carriage of claim 2, wherein said transverse control shaft extends through a central aperture of said at least one auxiliary wheel whereby said transverse control shaft and said at least one auxiliary wheel are supported by said auxiliary wheel support structure, and when said at least one auxiliary wheel is in the stowed position, application of a force to said at least one manipulative member provides a rotational force component rotating said transverse control shaft and a linear downwardly directed force component assisting in downward movement of said at least one auxiliary wheel to the deployed position.

4. The wheeled carriage of claim 1, said control apparatus including an auxiliary wheel biasing spring positioned between said wheeled base and said auxiliary wheel support structure for urging said at least one auxiliary wheel into the stowed position.

5. The wheeled carriage of claim 1, wherein said transverse control shaft moves along the same path as said at least one auxiliary wheel between the stowed position and the deployed position.

6. The wheeled carriage of claim 1, wherein said at least one auxiliary wheel comprises a first auxiliary wheel and said auxiliary wheel support structure supports a second auxiliary wheel parallel to said first auxiliary wheel and having the same axis.

7. The wheeled carriage of claim 1, wherein in the deployed position on a level floor, at least two of said floor surface engaging wheels adjacent said auxiliary wheel support structure are out of contact with the floor surface.

8. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another;

an auxiliary wheel support structure secured to said wheeled base and supporting at least one auxiliary wheel about an axis transverse to the length of said wheeled base, wherein said auxiliary wheel support structure is configured to enable movement of said at least one auxiliary wheel and to support said at least one auxiliary wheel in a first deployed position and in a second stowed position, said auxiliary wheel support structure comprising a pair of spaced parallel support arms each supporting said at least one auxiliary wheel at one end and each pivotably mounted to said wheeled base at the opposing end; and a control apparatus for controlling said auxiliary wheel support structure to move said at least one auxiliary wheel between at least the first deployed position whereat said at least one auxiliary wheel is in contact with a floor surface, and the second stowed position whereat said at least one auxiliary wheel is out of engagement with the floor surface, said control apparatus comprising:

- a longitudinal control shaft extending along the length of said wheeled base;
- an end oriented manipulative member fixedly secured to one end of said longitudinal control shaft;
- a transverse control shaft extending transverse to the length of said wheeled base;
- at least one laterally oriented manipulative member mounted to said transverse control shaft; and
- a transverse control shaft linkage comprising:
  - a link bar having one end joined pivotably to said transverse control shaft;
  - a rotatable transfer member rotatably mounted to one of said support arms of said auxiliary wheel support structure, said transfer member having a first projecting section pivotably connected to the other end of said link bar and a second projecting section;
  - a swivel member pivotably secured at one end to said second projecting section of said transfer member; and a swivel joint secured to said longitudinal control shaft for receiving said swivel member, wherein rotational movement of said transverse control shaft acts upon said link bar and said transfer member to generally linearly move said swivel member in a first direction, and wherein the linear movement of said swivel member is translated by said swivel joint into rotational movement of said longitudinal control shaft.

9. The wheeled carriage of claim 8, wherein said control apparatus comprises a cam apparatus mounted to said wheeled base and linking said longitudinal control shaft to a cam follower fixed to said auxiliary wheel support structure.

10. The wheeled carriage of claim 9, wherein said cam apparatus comprises a rotatable cam member and a cam control linkage so that rotation of said longitudinal control shaft rotates said cam member.

11. The wheeled carriage of claim 10, wherein said cam member includes a cam surface having a cam brake/neutral depression and a cam deployment depression, wherein each of said manipulative members is capable of operating said cam control linkage to move said cam follower into contact with said cam brake/neutral depression to provide said at least one auxiliary wheel in the stowed position and is capable of operating said cam control linkage to move said cam follower into contact with said cam deployment depression for lowering said cam follower and moving said at least one auxiliary wheel to the deployed position.

12. The wheeled carriage of claim 8, wherein said at least one laterally oriented manipulative member is lowered relative to the wheeled base during movement of said at least one auxiliary wheel to the deployed position and moves relative to the wheeled base during movement of said at least one auxiliary wheel to the stowed position.

13. A wheeled carriage for supporting a patient in a substantially horizontal position, comprising:

a patient support having head and foot ends and a pair of lateral sides intermediate said head and foot ends and a wheeled base supported on at least four floor surface engaging and castered wheels spaced from one another at locations defining corners of a theoretical polygon;

an auxiliary wheel support structure secured to said wheeled base for mounting at least one auxiliary wheel oriented inside a boundary of the theoretical polygon, wherein said auxiliary wheel support structure is configured to enable movement of said at least one auxiliary wheel and to support said at least one auxiliary wheel in a first deployed position and in a second stowed position; and a control apparatus for controlling said auxiliary wheel support structure to pivot said at least one auxiliary wheel between the first deployed position in contact with a floor surface, and the second stowed position whereat said at least one auxiliary wheel is out of engagement with the floor surface, said control apparatus comprising:

an elongate longitudinal control shaft having a longitudinal axis parallel to a longitudinal axis of said wheeled base;

at least one end oriented manipulative member connected to an end of said longitudinal control shaft and oriented adjacent one of said head and foot ends;

a transverse control shaft positioned in a central aperture of said at least one auxiliary wheel and oriented along an axis transverse to the longitudinal axis of said wheeled base; and at least one laterally oriented manually manipulative member connected to said transverse control shaft and oriented adjacent at least one of the pair of lateral sides, wherein said transverse control shaft rotates when said at least one auxiliary wheel moves to the deployed position and when said at least one auxiliary wheel moves to the stowed position, and wherein said longitudinally and laterally oriented manipulative members control deployment of said at least one auxiliary wheel.

14. The wheeled carriage of claim 13, said at least one auxiliary wheel comprising first and second spaced auxiliary wheels including auxiliary wheel bearings receiving said transverse control shaft so that said auxiliary wheels rotate independently from rotation of said transverse control shaft, and wherein said transverse control shaft moves along with said auxiliary wheels to the deployed position and to the stowed position.

15. The wheeled carriage of claim 13, wherein said transverse control shaft moves along with said at least one auxiliary wheel to the deployed position and to the stowed position, and wherein said control apparatus includes a transverse control shaft linkage linking said transverse control shaft to said longitudinal control shaft so that rotation of said transverse control shaft rotates said longitudinal control shaft.

16. The wheeled carriage of claim 15, said auxiliary wheel support structure including a cam follower, and wherein said control apparatus comprises a cam control apparatus so that rotation of said longitudinal control shaft rotates a cam member to overcome an auxiliary wheel biasing spring and pivot said cam follower and said auxiliary wheel support structure downwardly so that said at least one auxiliary wheel is in the deployed position.

17. The wheeled carriage of claim 13, wherein said at least one auxiliary wheel is in the stowed position when 1) said at least one longitudinally oriented manipulative member rotates said longitudinal control shaft to a brake position locking said castered wheels or 2) said at least one longitudinally oriented manipulative member rotates said longitudinal control shaft to a neutral position.

18. The wheeled carriage of claim 13, wherein said auxiliary wheel support structure comprises a pair of spaced parallel support arms that coact with a cross piece to support said at least one auxiliary wheel.

19. The wheeled carriage of claim 18, wherein said control apparatus includes a transverse control shaft linkage comprising:

a link bar having one end joined pivotably to and extending transversely of said transverse control shaft;

a rotatable transfer member rotatably connected relative to one of said support arms, said transfer member having a first projecting section pivotably connected to the other end of said link bar and a second projecting section;

a swivel member rotatably secured to said second projecting section of said transfer member; and a swivel joint secured to said longitudinal control shaft for receiving said swivel member, wherein rotational and translational movement of said transverse control shaft acts upon said link bar and said transfer member to move said swivel member in a substantially linear direction, whereby linear movement of said swivel member is translated by said swivel joint into rotational movement of said longitudinal control shaft.

20. The wheeled carriage of claim 13, wherein said control apparatus includes a transverse control shaft linkage that links said transverse control shaft to said longitudinal control shaft so that rotation of said transverse control shaft rotates said longitudinal control shaft.

21. The wheeled carriage of claim 13, wherein when said at least one auxiliary wheel is in the stowed position, application of a force to said at least one manipulative member provides a rotational force component rotating said transverse control shaft and a linear downwardly directed force component assisting in downward movement of said at least one auxiliary wheel to the deployed position.

22. A wheeled carriage for supporting a patient in a substantially horizontal position, comprising:

a rectangular patient support having head and foot ends and a pair of lateral sides intermediate said head and foot ends and a wheeled base supported on at least four floor surface engaging and castered wheels spaced from one another at locations defining corners of a theoretical polygon;

an auxiliary wheel support structure secured to said wheeled base for mounting at least one auxiliary wheel oriented inside a boundary of the theoretical polygon, wherein said auxiliary wheel support structure is configured to enable movement of said at least one auxiliary wheel and to support said at least one auxiliary wheel in a first deployed position and in a second stowed position; and a control apparatus for controlling said auxiliary wheel support structure to move said at least one auxiliary wheel between the first deployed position in contact with a floor surface, and the second stowed position whereat said at least one auxiliary wheel is out of engagement with the floor surface, said control apparatus comprising:

a transverse control shaft connected to said auxiliary wheel support structure and oriented along an axis transverse to the longitudinal axis of said wheeled base; and at least one laterally oriented manually manipulative member connected to said transverse control shaft and oriented adjacent at least one of said pair of lateral sides, wherein, when said at least one auxiliary wheel is in the stowed position, application of a force to said at least one laterally oriented manipulative member provides a rotational force component rotating said transverse control shaft and a linear downwardly directed force component assisting in downward movement of said at least one auxiliary wheel to the deployed position.

23. The wheeled carriage of claim 22, said control apparatus further comprising:

a longitudinal control shaft having an axis parallel to a longitudinal axis of said wheeled base; and an end manipulative member secured to an end of said longitudinal control shaft and oriented adjacent one of said head and foot ends; and an auxiliary wheel biasing spring positioned between said wheeled base and said auxiliary wheel support structure for urging said at least one auxiliary wheel into the stowed position, wherein said at least one auxiliary wheel comprises first and second spaced auxiliary wheels including auxiliary wheel bearings receiving said transverse control shaft so that said auxiliary wheels are rotatable without rotation of said transverse control shaft.

24. The wheeled carriage of claim 22, wherein said transverse control shaft extends through a central aperture of said at least one auxiliary wheel.

* * * * *